United States Patent [19]

Lin

[11] Patent Number: 4,937,109

[45] Date of Patent: Jun. 26, 1990

[54] ARTIFICIAL FLOWER ASSEMBLY

[76] Inventor: Jen W. Lin, No. 51, Lane 149, Sec. 3, Nankang Rd., Taipei, Taiwan

[21] Appl. No.: 386,995

[22] Filed: Jul. 31, 1989

[51] Int. Cl.⁵ .......................... A01G 5/04; A41G 1/00; A47G 7/00

[52] U.S. Cl. .................................... 428/23; 47/41.12; 248/27.8; 434/93; 428/24

[58] Field of Search ........................ 428/24, 27, 23, 25, 428/26; 47/41.12; 248/27.8; 434/93

[56] References Cited

U.S. PATENT DOCUMENTS 3,169,897  2/1965  Yue ......................................... 428/27
3,682,753  8/1972  Willinger ....................... 248/27.8 X
4,600,612  7/1986  Litwin et al. ...................... 428/24 X
4,606,950  8/1986  Corbet ........................... 248/27.8 X Primary Examiner—Henry F. Epstein
Attorney, Agent, or Firm—Cushman, Darby & Cushman

[57] ABSTRACT

An artificial flower assembly includes at least two flowering branches, each of which may be severed to be shortened or attached a connecting segment to be lengthened to a desired length marked with a chosen flower symbol; and a receptacle having at least two holes, each of which is marked with at least one hole symbol, each hole being used to hold a flowering branch having a flower symbol corresponding to a hole symbol of the same hole.

2 Claims, 5 Drawing Sheets

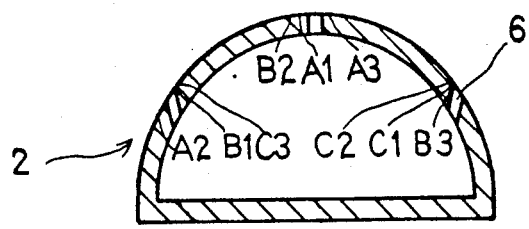
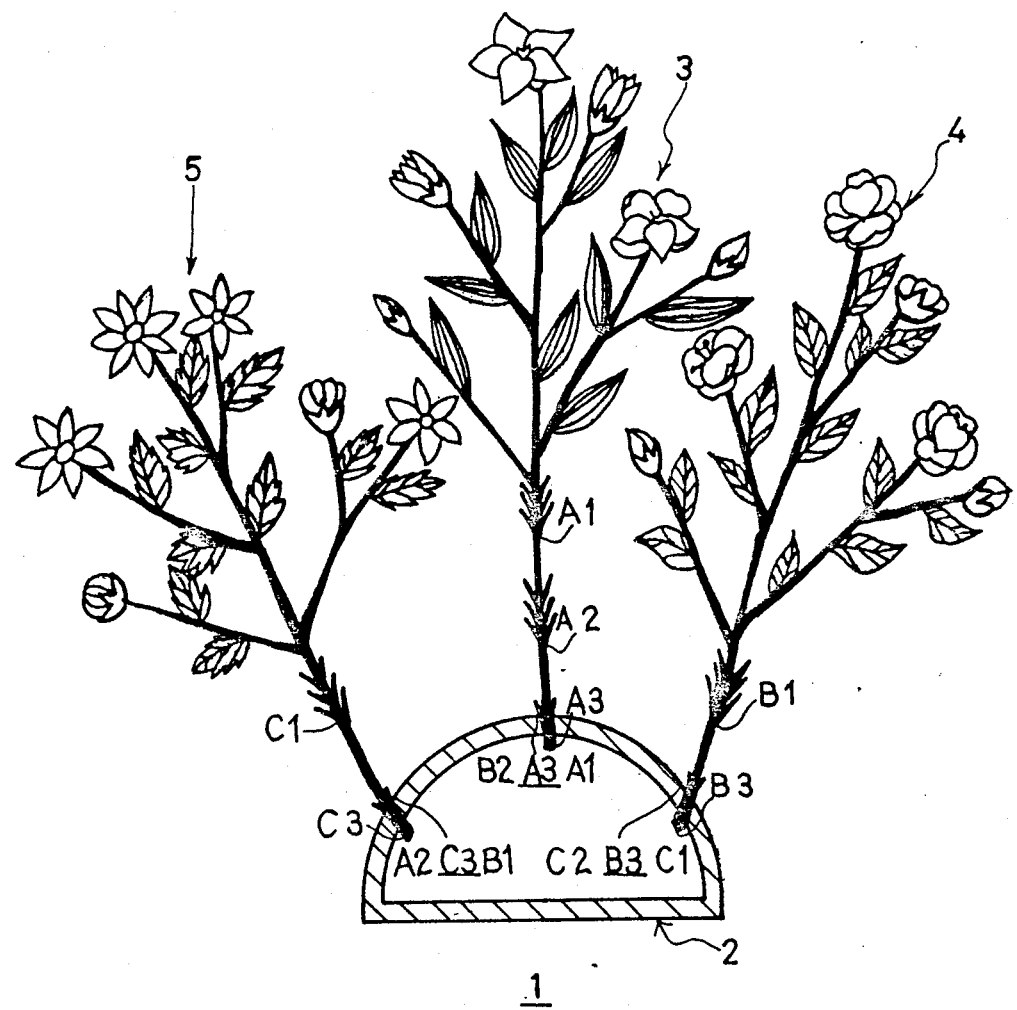

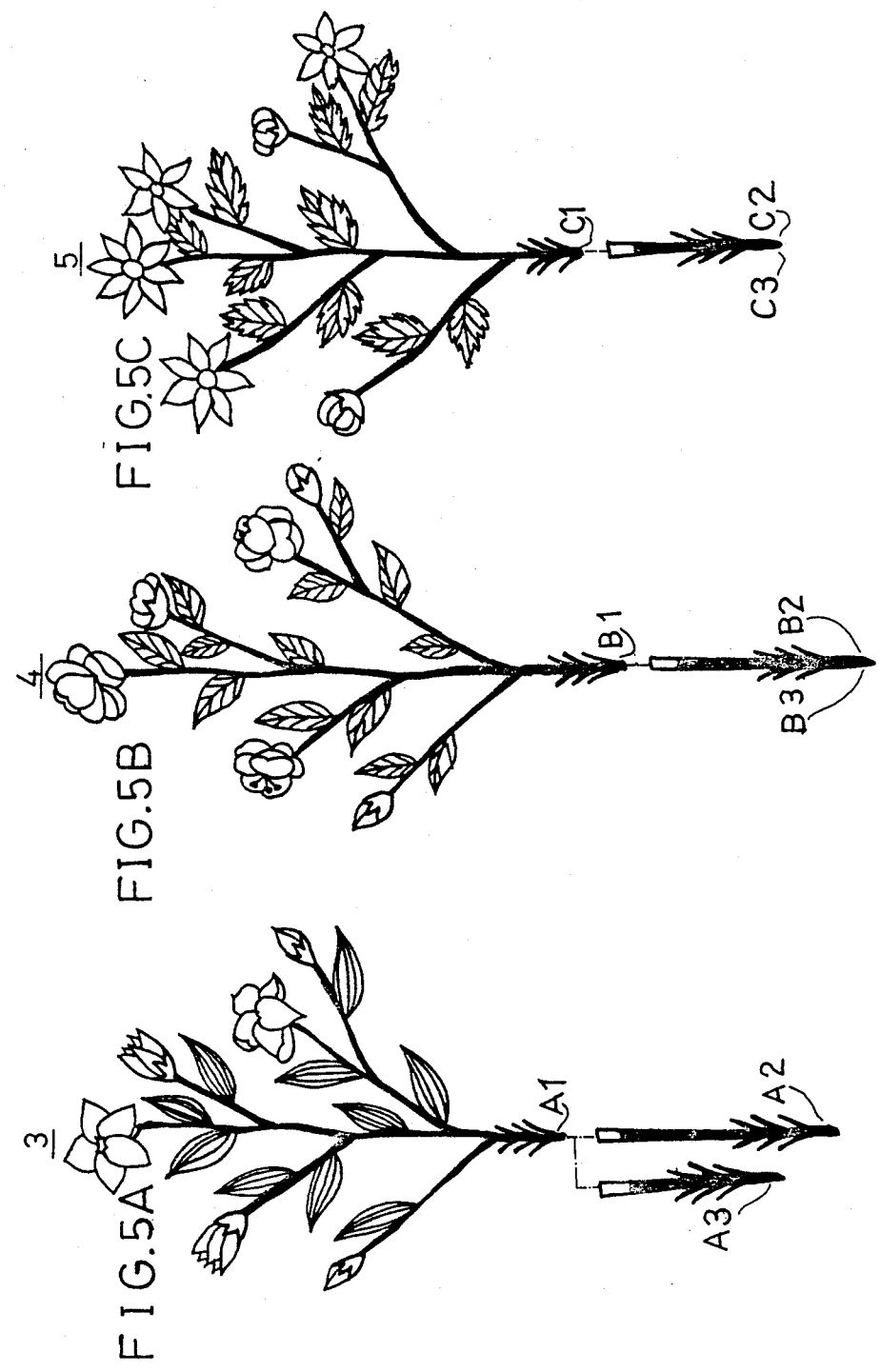

ARTIFICIAL FLOWER ASSEMBLY

BACKGROUND OF THE INVENTION

1. Field of the Invention

This invention relates to an artificial flower assembly, and particularly, to an artificial flower assembly having symbols marked on the flowering branch and the receptacle thereof to simplify the process of flower arrangement.

2. Description of the Prior Art

Conventionally, a perfect flower arrangement should be performed by one skilled in the art. It cannot be achieved by one who has never received any training concerning flower arrangement. Therefore, if one would like to make a good flower arrangement, he should first receive a flower arrangement training for at least several months.

SUMMARY OF THE INVENTION

It is an object of this invention to provide an artificial flower assembly which enables one who has never received any flower arrangement training to achieve a perfect flower arrangement.

The furthe object of this invention is to provide an artificial flower assembly having symbols marked on the flowering branch and the receptacle thereof to simplify the process of flower arrangement.

The artificial flower assembly of this invention comprises at least two flowering branches, each of which may be severed to be shortened or attached a connecting segment to be lengthened to a desired length marked with a chosen flower symbol; and a receptacle having at least two holes, each of which is marked with at least one hole symbol, each flowering branch being inserted into and held by one hole having a hole symbol corresponding to the flower symbol of the flowering branch. Therefore, this invention could greatly simplify the operation of flower arrangement.

While this invention is susceptible of embodiment in many different forms, only preferred embodiments of the invention are shown in the drawings and will herein be described in detail with the understanding that the present disclosure is to be considered as an exemplification of the principles of the invention and is not intended to limit the broad aspect of the invention to the embodiments illustrated.

BRIEF DESCRIPTION OF THE DRAWING

FIG. 1 is a partially cross-sectional perspective view showing a preferred embodiment of this invention wherein all of the flowering branches are in full lengths and are inserted into the holes of the receptacle;

FIGS. 5A, 5B, and 5C are views showing the second way of changing the length of each flowering branch included in the artificial flower assembly of this invention by optionally severing a main segment at different positions along its length; and FIG. 6 is a cross-sectional view of a receptacle used in the artificial flower assembly according to this invention.

DESCRIPTION OF THE PREFERRED EMBODIMENTS

Figure 2:
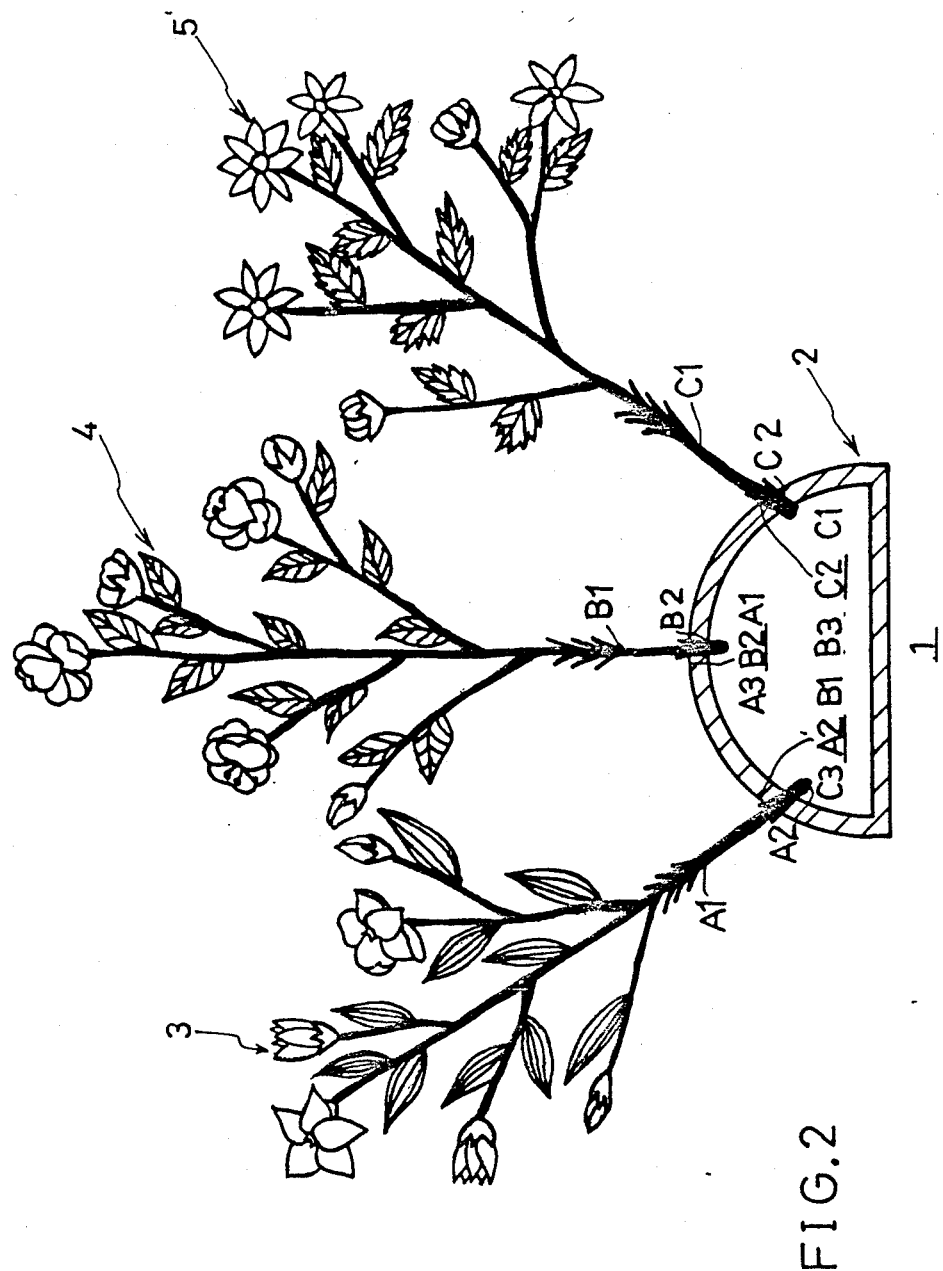
FIG. 2 is a partially cross-sectional perspective view of another preferred embodiment of this invention.
Figure 3:
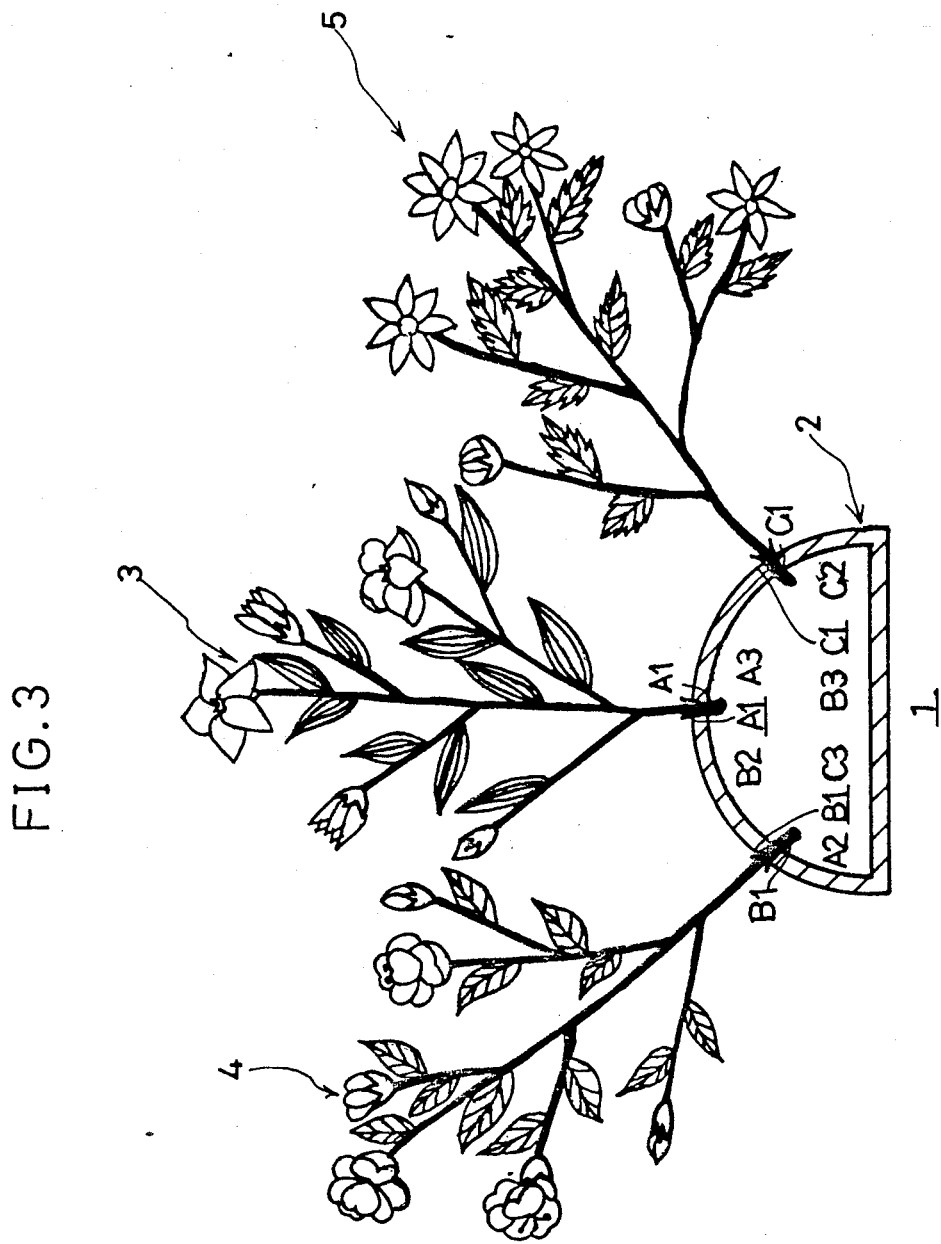
FIG. 3 is a partially cross-sectional perspective view showing yet another preferred embodiment of this invention.

As best shown in FIGS. 1, 2, and 3, the present artificial flower assembly 1 comprises a receptacle 2 and several flowering branches 3, 4, and 5. The design of the whole flower assembly can be varied by changing the length of each flowering branch and the positions where the flowering branches are inserted into the receptacle 2. The flower arrangement of the present artificial flower assembly can be easily finished by an inexperienced person according to a list of symbol combinations, prepared by a skilled person or an instructor, denoting the possible selections concerning the lengths and insertion positions of the flowering branches.

Figure 4A:
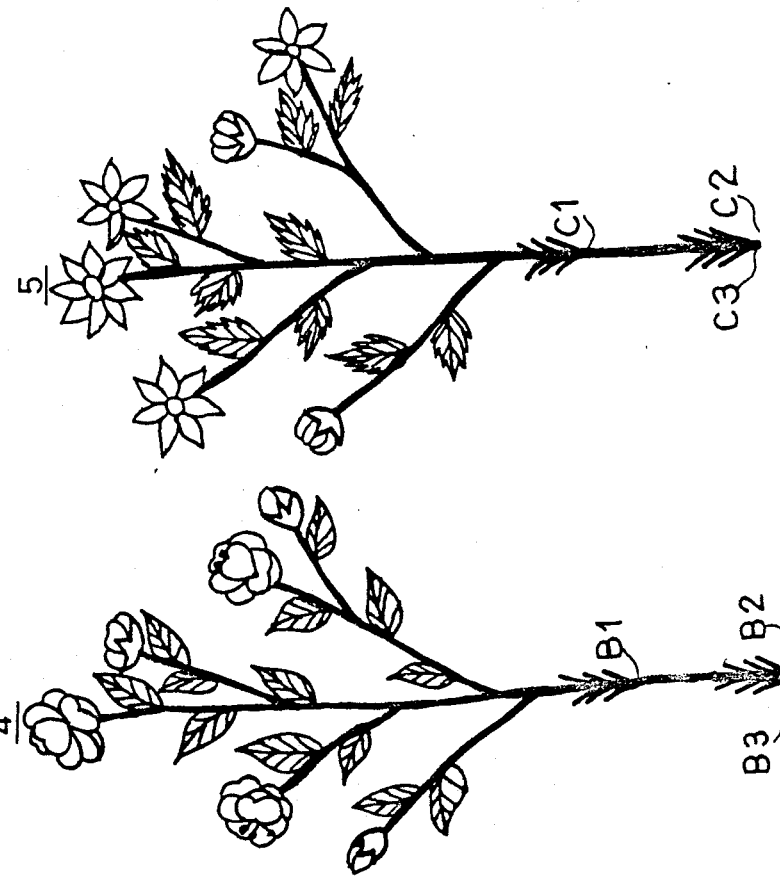
FIGS. 4A, 4B, and 4C are views showing the first way of changing the length of each flowering branch included in the artificial flower assembly of this invention by optionally attaching connecting segments of different lengths to a main segment.
Figure 4B:
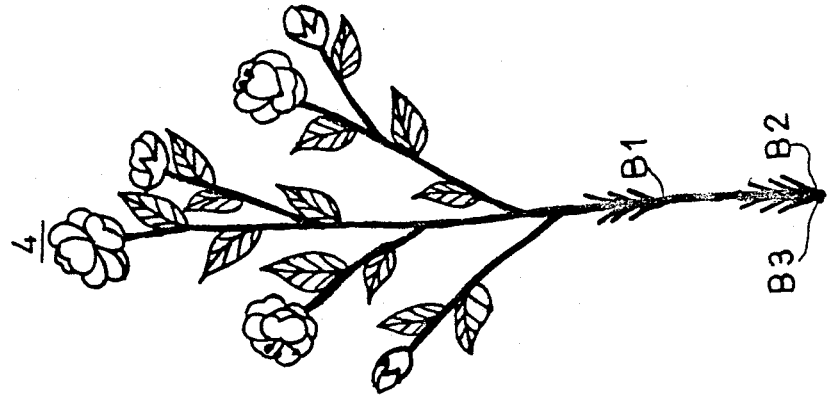
Figure 4C:
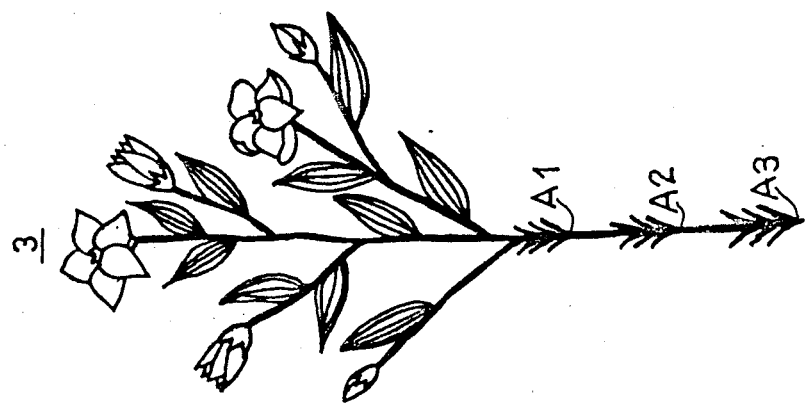

FIGS. 4A, 4B, and 4C show the first way of changing the length of each flowering branch. The flowering branch 3 is marked, along its length, with three flower symbols A1, A2, and A3. Similarly, the flowering branch 4 is marked, along its length, with three flower symbols B1, B2, and B3. Also the flowering branch 5 is marked, along its length, with three flower symbols C1, C2, and C3. The three flower symbols on the same flowering branch may be located, respectively, at three different positions as in the case of flowering branch 3 (FIG. 4A). Alternatively, two of the three flower symbols on the same flowering branch may also be located at the same positions as in the case of flowering branches 4 and 5 (FIGS. 4B and 4C). Each flowering branch may selectively be severed at any position marked with a flower symbol or may remain uncut so as to take a desired length. For example, flowering branch 3 may be severed at the position marked with A1 or A2, or may remain uncut as desired so as to selectively have a longest length with a flower symbol A3 at its lower end, or a medium length with a flower symbol A2 at its lower end, or a shortest length with a flower symbol A1 at its lower end.

The second way of changing the length of each flowering branch will now be described with reference to FIGS. 5A, 5B, and 5C. Particularly referring to FIG. 5A, the flowering branch 3 comprises a main segment and two connecting segments which are, respectively, marked at their lower ends with flower symbols A1, A2, and A3. The two connecting segment A2 or A3 may be optionally connected to the lower end of the main segment A1 in a disengageable manner, for example, by means of a plug-socket like connection so that the flowering branch 3 may selectively have a length of the main segment A1 only, or segments A1+A2, or segments A1+A3.

The structure of the receptacle 2 will now be described with reference to FIG. 6. The receptacle 2 is provided with several holes 6 each of which is marked with different hole symbols. The hole symbols disposed on the holes 6 are designed by people skilled in flower arrangement and correspond to those flower symbols marked on the flowering branches 3, 4, and 5.

In practice, if one chooses the first way of changing the length of each flowering branch and selects a symbol combination of (A1, B1, and C14) for the artificial flower assembly, the A2 and A3 segments must first be severed from the flowering branch 3 and the remaining portion of the flowering branch 3 with a flower symbol A1 marked at its lower end be inserted into the hole having a hole symbol A1. Similarly, segments B2 (B3) and C2 (C3) must be removed from the flowering branches 4 and 5, respectively, and the remaining portions of the flowering branches 4 and 5 can then be inserted into the holes 6 marked with hole symbols B1 and C1, respectively, to finally obtain an artificial flower assembly as shown in FIG. 3. Therefore, a perfect flower arrangement can be easily achieved by an inexperienced people.

While specific embodiments have been illustrated and described, numerous modifications come to mind without significantly departing from the spirit of the invention and the scope of protection is only limited by the scope of the accompanying claims.

What is claimed is:

1. An artificial flower assembly comprising:
    at least two flowering branches, each of said branches including a main segment and at least one connecting segment, said connecting segment being selectively connectable to said main segment in a disengageable manner so as to change the length of said flowering branch as desired, each of said main and connecting branch segments having a lower end with a flower symbol mark thereon; and
    a receptacle having at least two holes, each of said hole being marked by at least one hole symbol, each of said flowering branches being inserted into and held by one of said holes having a said hole symbol corresponding to said flower symbol marked on said lower end of flowering branch.

2. an artificial flower assembly comprising:
    at least two flowering branches, each of said flowering branches including at least one flower symbol mark along the length thereof and at least one severing mark along the length thereof so that each of said flowering branches may be severed at a desired marked position such that the length of said branch may be changed; and
    a receptacle having at least two holes, each of said holes including a mark with at least one hole symbol, each of said flowering branches being inserted into and held by one of said holes having a hole symbol corresponding to said flower symbol marked on said inserted flowering branch.

* * * * *